United States Patent
Fallon et al.

(10) Patent No.: US 12,084,606 B2
(45) Date of Patent: Sep. 10, 2024

(54) TAPE ASSEMBLY AND METHOD OF USING THE SAME

(71) Applicant: tesa SE, Norderstedt (DE)

(72) Inventors: Robert J. Fallon, Milford, MI (US); Joseph J. Carroll, Grand Rapids, MI (US); Clint R. Bierstetel, Grand Rapids, MI (US)

(73) Assignee: tesa SE, Norderstedt (DE)

( * ) Notice: Subject to any disclaimer, the term of this patent is extended or adjusted under 35 U.S.C. 154(b) by 378 days.

(21) Appl. No.: 17/130,390

(22) Filed: Dec. 22, 2020

(65) Prior Publication Data

US 2022/0195255 A1    Jun. 23, 2022

(51) Int. Cl.
| | | |
|---|---|---|
| *C09J 7/21* | (2018.01) | |
| *B05D 1/32* | (2006.01) | |
| *C09J 7/24* | (2018.01) | |
| *C09J 7/25* | (2018.01) | |
| *C09J 7/29* | (2018.01) | |
| *C09J 7/38* | (2018.01) | |

(52) U.S. Cl.
CPC .............. *C09J 7/385* (2018.01); *B05D 1/325* (2013.01); *C09J 7/21* (2018.01); *C09J 7/245* (2018.01); *C09J 7/255* (2018.01); *C09J 7/29* (2018.01); *C09J 7/383* (2018.01); *C09J 2407/00* (2013.01); *C09J 2427/00* (2013.01); *C09J 2433/00* (2013.01); *C09J 2483/00* (2013.01); *Y10T 428/2839* (2015.01); *Y10T 428/2848* (2015.01); *Y10T 428/2891* (2015.01)

(58) Field of Classification Search
None
See application file for complete search history.

(56) References Cited

U.S. PATENT DOCUMENTS

| | | |
|---|---|---|
| 3,187,968 A | 6/1965 | Favre |
| 4,415,400 A | 11/1983 | Rammelmeyr |
| 4,508,587 A | 4/1985 | Hunter |
| 4,582,737 A | 4/1986 | Torgerson et al. |
| 4,588,469 A | 5/1986 | Hunter |
| 4,981,537 A | 1/1991 | Heil et al. |
| 5,269,871 A | 12/1993 | Longworth et al. |
| 6,478,068 B1 | 11/2002 | Brown |
| 7,028,736 B1 | 4/2006 | Miller |
| 7,921,896 B2 | 4/2011 | Andersen |
| 8,297,327 B2 | 10/2012 | Hardy |
| 9,150,377 B2 | 10/2015 | Gibson |
| 10,507,997 B2 | 12/2019 | Himmelsbach et al. |
| 2006/0099374 A1* | 5/2006 | Dureiko ............... C09J 7/29 156/247 |
| 2006/0231192 A1* | 10/2006 | Wahlers-Schmidlin ............... H02G 11/00 156/185 |
| 2009/0107613 A1 | 4/2009 | Cosentino |
| 2010/0048074 A1* | 2/2010 | Kopf .................. C09J 7/21 156/215 |
| 2013/0020029 A1 | 1/2013 | Lazar |
| 2014/0308482 A1* | 10/2014 | Masunari ............. C09J 7/21 428/161 |

FOREIGN PATENT DOCUMENTS

| | | |
|---|---|---|
| DE | 102018206468 A1 | 10/2019 |
| WO | 2018010844 A1 | 1/2018 |

\* cited by examiner

*Primary Examiner* — Anish P Desai
(74) *Attorney, Agent, or Firm* — Price Heneveld LLP

(57) ABSTRACT

A tape assembly for masking an object to be painted and method of use is provided. The tape assembly is defined by a tape body having an anterior side, a posterior side, a body first edge, and an opposing body second edge. The tape body includes a first portion including a first substrate having a first adhesive layer on a posterior side of the first substrate, a second portion including a second substrate having a second adhesive layer on an anterior side of the second substrate, and a third portion including a third substrate having a third adhesive layer on a posterior side of the third substrate. The first and third portions partially overlap with the second portion in opposing first and second overlapping regions, respectively.

12 Claims, 6 Drawing Sheets

TAPE ASSEMBLY AND METHOD OF USING THE SAME

FIELD OF THE DISCLOSURE

The present disclosure generally relates to a tape assembly for masking an object to be coated with a material in a painting process and methods of use, and more specifically to a tape assembly for masking vehicle components to be painted and methods of use.

BACKGROUND

One of the processes involved in producing automotive vehicles involves the painting of components of the vehicle to provide decorative and/or functional finishes to the components. Due to the variety of colors and/or finishes each vehicle may include, it is often necessary to protect, also referred to as mask, some portions of the vehicle during a painting process in order to apply a decorative and/or functional finish to only some portions of the vehicle and not others. For example, some vehicles have a two-tone color in which a roof of the vehicle is painted a first color and a body of the vehicle is painted a second color that is different than the first color. Typically, producing this style of two-toned vehicle involves painting the roof the first color and then painting the body of the vehicle the second color (or vice versa). For example, a conventional painting process can include using an adhesive tape to attach a masking cover to the vehicle that seals around the portion of the vehicle to be masked during the painting process to allow for different decorative/functional finishes to be applied to the various components of the car. However, the complex and three-dimensional shapes of vehicle components, for example, around sun roofs, door trim panels, window openings, etc., can often be challenging and time-consuming to mask using conventional tape to attach a masking cover and form a desired seal around the perimeter of the area to be masked.

Thus, there is a need to provide a tape assembly and method of use for masking portions of an object during a coating process that can provide time savings and/or simplify application of a masking cover during the coating process.

SUMMARY

According to an aspect of the present disclosure, a tape assembly for masking an object to be coated includes a tape body defined by an anterior side, a posterior side, a body first edge, and an opposing body second edge. The tape body includes a first portion that extends along the body first edge and comprises a first substrate having a first adhesive layer on a posterior side of the first substrate, a second portion extending along a proximal edge of the first portion, opposite the body first edge, and comprising a second substrate having a second adhesive layer on an anterior side of the second substrate, wherein the proximal edge of the first portion partially overlaps the second portion to form a first overlapping region, and a third portion extending along the body second edge and adjacent to the second portion, the third portion comprising a third substrate having a third adhesive layer on a posterior side of the third substrate, wherein a proximal edge of the third portion, opposite the body second edge, partially overlaps the second portion to form a second overlapping region. The first overlapping region is spaced from the second overlapping region such that at least a portion of the second adhesive layer is exposed between the first and second overlapping regions.

According to another aspect of the present disclosure, method of masking an object to be coated is provided. The method includes dispensing a tape assembly defined by a tape body having an anterior side, a posterior side, a body first edge, and an opposing body second edge. The tape body includes a first portion that extends along the body first edge and comprises a first substrate having a first adhesive layer on a posterior side of the first substrate, a second portion comprising a second substrate having a second adhesive layer on an anterior side of the second substrate, wherein the first portion partially overlaps with the second portion to form a first overlapping region, and a third portion that extends along the body second edge, the third portion comprising a third substrate having a third adhesive layer on a posterior side of the third substrate, wherein a proximal edge of the third portion, opposite the body second edge, partially overlaps the second portion to form a second overlapping region, spaced from the first overlapping region. The method includes applying the first adhesive layer and the third adhesive layer along at least one edge of a region of an object to be masked. The method also includes applying a masking cover to the second adhesive layer of the second portion to retain the masking cover in place over the region of the object to be masked.

These and other aspects, objects, and features of the present disclosure will be understood and appreciated by those skilled in the art upon studying the following specification, claims, and appended drawings.

DETAILED DESCRIPTION

Aspects of the present disclosure reside primarily in combinations of apparatus components and method steps relating to a tape assembly and methods of use for masking an object during a coating process, such as masking portions of a vehicle during a painting process. The tape assembly of the present disclosure provides a tape that is capable of securing a masking cover to an object to protect, also referred to as mask, portions of the object during a coating process. In some aspects, the tape assembly is in the form of a roll that can be unwound to provide a length of tape assembly that can be attached to a surface by first and third adhesive layers to provide a second adhesive layer to which a masking cover can be secured, optionally without the use of a removable release liner between each layer in the roll. The tape assembly of the present disclosure allows an operator to quickly and efficiently form a seal around an area to be masked, which can provide time and/or cost savings during a painting process. In addition, in some aspects of the present disclosure, the ability to store the tape assembly as a roll facilitates dispensing of the tape assembly in use, providing additional time and/or cost savings. In some aspects, the absence of a removable release liner between each layer in the roll can also provide additional time and/or cost savings by decreasing the number of steps required to apply the tape assembly and/or by decreasing the amount of waste produced during application of the tape assembly.

While aspects of the present disclosure are described in the context of painting vehicle components and body parts, it will be understood that the tape assembly and methods of use according to the present disclosure can be used in any application in which it is desired to mask portions of an object to protect the masked portions during a painting process. Non-limiting examples of applications for the tape assembly and methods of the present disclosure include masking automotive vehicles, water craft (boats, ships), trains, airplanes, architectural structures (buildings, houses, bridges, etc.), and furniture.

Figure 1:
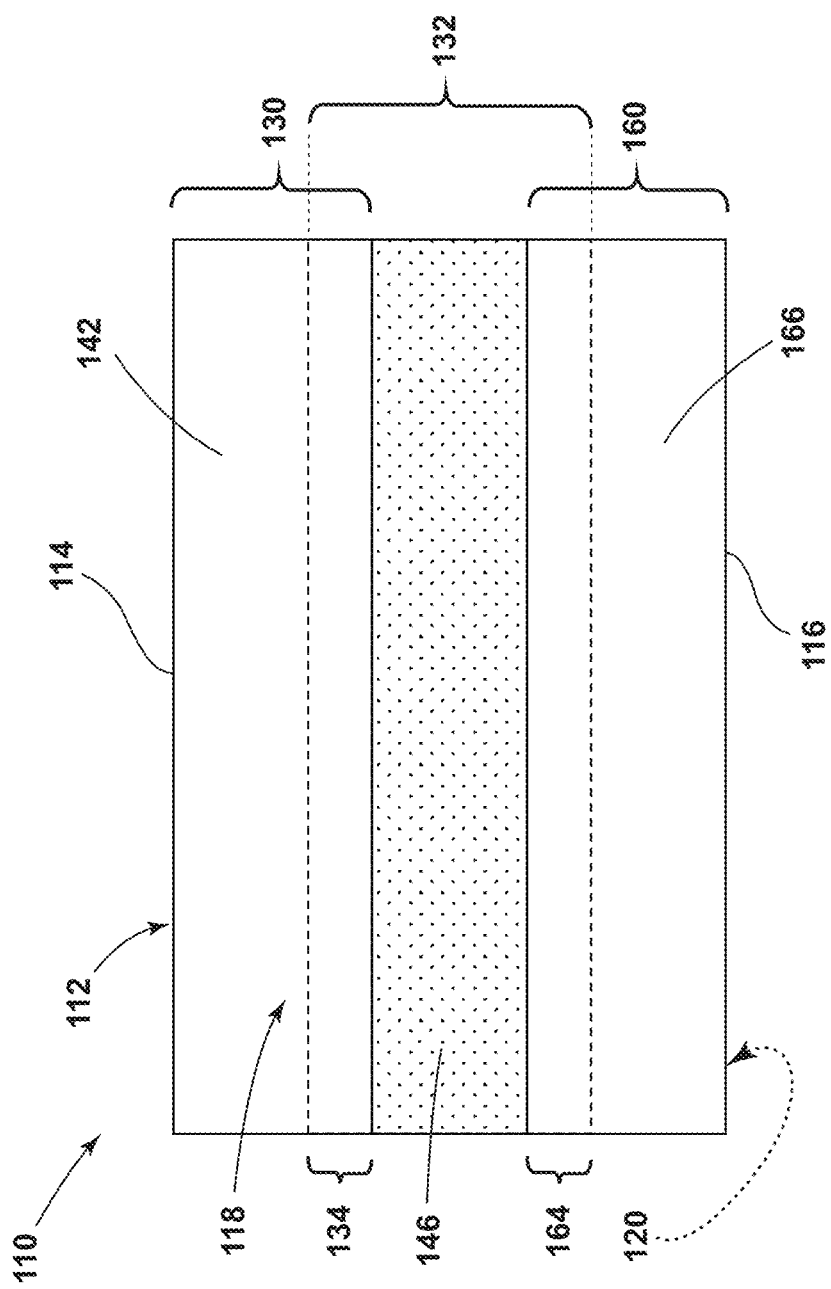
FIG. 1 is a top-down view of a tape assembly including a tape body having first, second, and third portions, according to an aspect of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The apparatus components and method steps of the present disclosure have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "paint" is used to refer to materials which may be applied to a surface of an object using any suitable applications means, non-limiting examples of which include brushing, spraying, vapor deposition, spin coating, rolling, and rubbing, to provide the surface with a desired decorative finish and/or functional finish. The terms "painting," "painting process," "coating," and "coating process" are used interchangeably to refer to the method by which such materials are applied to the surface to provide the surface with the decorative and/or functional finish. Exemplary materials that can be used in a painting process according to aspects of the present disclosure can include any material that provides a colored, decorative, aesthetic, and/or functional finish to a surface, and which may include colored pigments, aqueous solvents, non-aqueous solvents, polymeric materials, iridescent pigments, corrosion prevention additives, ultraviolet (UV) protection additives, metal flakes/particles, scratch-resistant additives, and/or stain-resistant additives, etc. Non-limiting examples of materials that can be applied in a painting process includes base coat materials, primer coat materials, pigmented paints, metallic paints, pearlescent paints, stains (e.g., for use on natural wood and/or composite materials), protective topcoats, and clearcoats.

Figure 2:
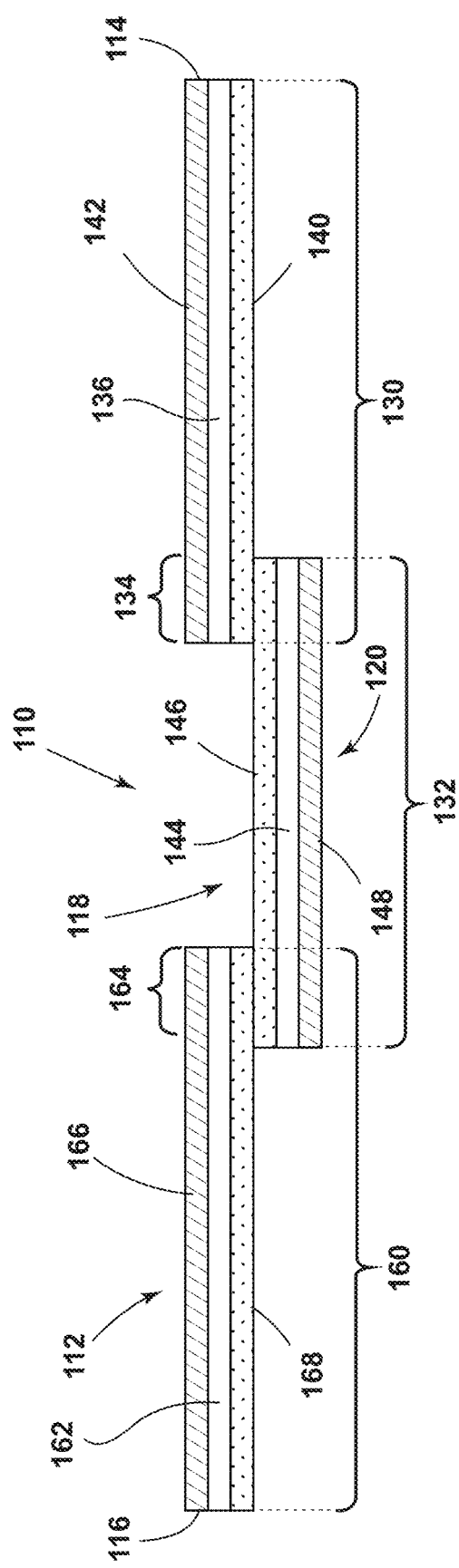
FIG. 2 is a cross-sectional view of the tape assembly of FIG. 1, according to an aspect of the present disclosure.

FIGS. 1-2 illustrate a tape assembly 110 that includes a tape body 112 defined by a tape body first edge 114, an opposing tape body second edge 116, an anterior side 118, and a posterior side 120. The tape body 112 includes a first portion 130 extending along the first edge 114, an adjacent second portion 132, and a third portion 160 extending along the second edge 116 and adjacent to the second portion 132, opposite the first portion 130. The first portion 130 partially overlaps with the second portion 132 to form a first overlapping region 134 generally aligned with and disposed between the first and second edges 114, 116. The third portion 160 partially overlaps with the second portion 132 to form a second overlapping region 164 that is generally aligned with and disposed between the first and second edges 114, 116, and which is spaced from the first overlapping region 134.

As can best be seen in FIG. 2, the first portion 130 includes a first substrate 136 having a first adhesive layer 140 on the posterior side 120 of the tape body 112 (i.e., on the posterior side of the first substrate 136) and optionally a first release coating 142 on the anterior side 118 side of the tape body 112 (i.e., on the anterior side of the first substrate 136). The second portion 132 includes a second substrate 144 having a second adhesive layer 146 on the anterior side 118 of the tape body 112 (i.e., on the anterior side of the second substrate 144) and optionally a second release coating 148 on the posterior side 120 of the tape body 112 (i.e., on the posterior side of the second substrate 144). Further, the first portion 130 partially overlaps with the second portion 132 in the first overlapping region 134 such that at least a portion of the second adhesive layer 146 is exposed on the anterior side 118 of the tape body 112 and a portion of the first adhesive layer 140 is exposed on the posterior side 120 of the tape body 112. In the first overlapping region 134, the first adhesive layer 140 abuts the second adhesive layer 146. The third portion 160 partially overlaps with the second portion 132 in the second overlapping region 164 such that at least a portion of the second adhesive layer 146 is exposed on the anterior side 118 of the tape body 112 and a portion of the third adhesive layer 168 is exposed on the posterior side 120 of the tape body 112. In the second overlapping region 164, the third adhesive layer 168 abuts the second adhesive layer 146.

The second portion 132 can be coupled with the first portion 130 and the third portion 160 in the respective first and second overlapping regions 134 and 164 using any suitable type of bond, non-limiting examples of which include a pressure bond, heat bond, and adhesive bond. In some aspects, the first portion 130 is laminated with the second portion 132 in the first overlapping region 134 by applying a force to press the first portion 130 and the second portion 132 together in the first overlapping region 34. Optionally, the lamination process may use heat and/or an additional adhesive to facilitate bonding the first and second portions 130, 132 in the first overlapping region 134. The third portion 160 can be coupled with the second portion 132 in the second overlapping region 164 in a manner similar to that described for the various aspects of laminating the first portion 130 and the second portion 132 in the first overlapping region 134. For a given tape assembly 110, the first and third portions 130 and 160 may be coupled with the second portion 132 in a similar manner or in a different manner using similar or different coupling processes and/or materials. In some aspects, the abutting first and second adhesive layers 140 and 146 in the first overlapping region 134 may adhere to one another to facilitate coupling the first and second portions 130, 132 together in the first overlapping region 134. In some aspects, the abutting second and third adhesive layers 146 and 168 in the second overlapping region 164 may adhere to one another to facilitate coupling the second and third portions 132, 160 together in the second overlapping region 164.

One or more of the components of the first, second, and third portions 130, 132, and 160 may be the same or different than one or more of the other components of the first, second, and third portions 130, 132, and 160. In one aspect, the first, second, and third substrates 136, 144, and 162 may each be the same material or one or more of the first, second, and third substrates 136, 144, and 162 can include a material that is different than the other of the first, second, and third substrates 136, 144, and 162. In one example, the first, second, and third substrates 136, 144, and 162 contain the same material. In another example, the first and third substrates 136 and 162 contain the same material and the second substrate 144 contains a material that is different than the first and third substrates 136 and 162. In yet another example, each of the first, second, and third substrates 136, 144, and 162 contain different materials.

In one aspect, the first, second, and third adhesive layers 140, 146, and 168 may each contain the same material or one or more of the first, second, and third adhesive layers 140, 146, and 168 may contain a different material. In one example, the first, second, and third adhesives layers 140, 146, and 168 contain the same material. In another example, the first and third adhesive layers 140 and 168 contain the same material and the second adhesive layer 146 contains a different material. In yet another example, each of the first, second, and third adhesive layers 140, 146, and 168 contain a different material.

In another aspect, the first, second, and third release coatings 142, 148, and 166 may be the same material or one or more of the first, second, and third release coatings 142, 148, and 166 may be a different material than the other of the first, second, and third release coatings 142, 148, and 166. In one example, the first, second, and third release coatings 142, 148, and 166 may all contain the same material. In another example, the first and third release coatings 142 and 166 may contain the same material and the second release coating 148 may contain a different material. In yet another example, each of the first, second, and third release coatings 142, 148, and 166 contain a different material. In one example, each of the first, second, and third portions 130, 132, and 160 include a respective first, second, and third release coating 142, 148, and 166. In another example, the first and third portions 130 and 160 include a respective first and third release coating 142 and 166 and the second portion 132 is free of a release coating. In yet another example, the second portion 132 includes the release coating 148 and the first and third portions 130 and 160 are free of a release coating.

The first substrate 136, second substrate 144, and third substrate 162, which may also be referred to as the first, second, and third backings 136, 144, and 162, respectively, can include any suitable material for supporting an adhesive on one side and optionally a release coating on the opposite side. Non-limiting examples of suitable materials for the first, second, and third substrates 136, 144, and 162 include paper, creped-paper, polyvinylchloride, polyvinylchloride-polyethylene terephthalate laminates, polyethylene terephthalate, polypropylene, polyethylene, mono-oriented polypropylene (MOPP), non-woven synthetic and natural materials, woven synthetic and natural materials, fleece, fabric, and combinations thereof.

The first, second, and third adhesive layers 140, 146, and 168 may be the same or different adhesive material and can be any suitable adhesive based on the intended application of the tape assembly 110. Non-limiting examples of suitable adhesives include natural rubber, acrylic-based adhesives, silicone-based adhesives, modified acrylic-based adhesives, modified rubber-based adhesives, and combinations thereof. In applications in which the first and/or third adhesive layers 140 and 168 are used to adhere the tape assembly 110 to a surface that already has a decorative and/or functional coating, the first and/or third adhesive layer 140, 168 may be selected to provide sufficient adhesion for securing the tape assembly 110 to the surface while also being removable without damaging the surface and/or leaving behind little to no residue on the surface. Adhesives known in the field of automotive painting as "fine line" adhesives, which are typically considered suitable for use with Class A surfaces, are examples of adhesives suitable for use with the tape assembly 110. In applications in which the second adhesive layer 146 is intended for use in securing a masking cover, the second adhesive layer 146 may be selected at least in part based on the type of material used to form the masking cover. In applications where the second adhesive layer 146 does not adhere to a finished surface or does not need to be removable, stronger adhesives and/or lower cost adhesives may be selected for the second adhesive layer 146. For example, in some applications, forming a strong seal with the masking cover may be prioritized over removability, particularly in applications where the masking cover is not separated from the tape assembly 110 after attachment to the second adhesive layer 146. The masking cover may be any suitable material, non-limiting examples of which include paper, polymeric material, natural and synthetic woven material, natural and synthetic non-woven material, and combinations thereof.

In some aspects, the first, second, and/or third adhesive layer 140, 146, and 168 can have a peel adhesion to stainless steel of from about 1.8 N/cm to about 6 N/cm. In some aspects, the first, second, and/or third adhesive layers 140, 146, and 168 can be selected based at least in part on a desired peel adhesion for the intended application. For example, in applications where the first and third adhesive layers 140 and 168 are configured to adhere the tape assembly 110 to a surface to be masked, the first and third adhesive layers 140 and 168 may be selected from adhesives having a peel adhesion to stainless steel of from about 1.8 N/cm to about 6 N/cm, about 2 N/cm to about 6 N/cm, about 3 N/cm to about 6 N/cm, about 1.8 N/cm to about 5.5 N/cm, about 2 N/cm to about 5.5 N/cm, about 3 N/cm to about 5.5 N/cm, about 1.8 N/cm to about 4 N/cm, about 2 N/cm to about 4 N/cm, or about 3 N/cm to about 4 N/cm. In applications where the second adhesive layer 146 is configured to adhere to a masking cover (e.g., a polymeric film or paper sheet), the second adhesive layer 146 may be selected from adhesives having a peel adhesion to stainless steel of from about 3 N/cm to about 5 N/cm, about 3 N/cm to about 4.5 N/cm, or about 3 N/cm to about 4 N/cm.

In some aspects, the first, second, and/or third substrates 136, 144, and 162 can include a primer adhesive to facilitate adhesion of the first, second, and/or third adhesive layers 140, 146, and 168 to the respective first, second, and/or third substrates 136, 144, and 162. The use of a primer adhesive and the type of primer adhesive may be based at least in part on the materials of the first, second, and/or third adhesive layers 140, 146, and 168 and the first, second, and/or third substrates 136, 144, and 162, respectively. In applications in which one or more of the first, second, and/or third release coatings 142, 148, and 166 are present, a primer may be used to facilitate adhesion of the first, second, and/or third release coating 142, 148, and 166 to the respective first, second, and third substrates 136, 144, and 162.

The first, second, and third release coatings 142, 148, and 166 can have the same or a different release coating composition. In some aspects, the first, second, and third release coatings 142, 148, and 166 can be selected in concert with the respective first, second, and third adhesive layers 140, 146, and 168 to allow the tape assembly 110 to be wound into a roll and unwound during use to apply the tape assembly 110 to a surface without the use of a removable release liner between each layer of the tape assembly 110. When the tape assembly 110 is wound into a roll, the first adhesive layer 140 will generally be aligned with and possibly abut at least portions of the first release coating 142 on an adjacent portion of the wound tape body 112. In the roll, the third adhesive layer 168 will be aligned with and possibly abut at least portions of the third release coating 166 on an adjacent portion of the wound tape body 112. In some aspects, when wound in a roll, adjacent layers of the second portion 132 may be offset from one another due to the thickness of the first and third portions 130 and 160 and thus the second release layer 148 may not be needed in order to allow for the desired release force during unwinding of the roll. In some aspects, the first, second, and/or third release coatings 142, 148, and 166 can be selected to allow for a desired release force to increase or decrease the force required to unwind the roll of the tape assembly 110. Non-limiting examples of suitable materials for the first, second, and/or third release coatings 142, 148, and 166 include carbamate and silicone. In some examples, a removable release liner may be used with the wound tape assembly 110 between wound layers of the tape body 112 and/or between pre-cut strips of the tape assembly 110.

The tape body 112, first, second, and third portions 130, 132, and 160, and the first and second overlapping regions 134 and 164 can have any suitable dimensions. The length of the tape body 112, and thus the length of the first, second, and third portions 130, 132, and 160, and the first and second overlapping regions 134 and 164, can be suitable for winding the tape body 112 into a roll that can be unwound by hand and/or using a manual or automatic dispenser for application to a surface. In some aspects, the length of the tape body 112 may correspond to pre-cut strips ready to apply to a surface in predetermined lengths (or which may be cut to a desired length). The width of the tape body 112 generally corresponds to the width of the first, second, and third portions 130, 132, and 160 minus the width of the first and second overlapping regions 134 and 164. In some aspects, the width of the first and third portions 130, 160 are selected, at least in part, to provide a desired seal with the surface to which the first and third portions 130, 160 are adhered. In some aspects, the width of the second portion 132 can be selected, at least in part, to provide a desired seal between the second portion 132 and the intended masking cover to protect the masked surface during a painting process. In some aspects, the width of the first, second, and/or third portions 130, 132, and 160 can be selected, at least in part, to decrease a likelihood of unintentional tearing of the respective portion during an intended use. For example, at a given width, a paper substrate may have a lower resistance to tearing than a PVC substrate. The width of a portion containing a paper substrate may be selected to balance between providing the desired surface area for sealing with a surface or a masking cover and providing a desired resistance to unintended tearing during use.

In some aspects, the width of the first overlapping region 134 and the second overlapping region 164 may be based at least in part on a width sufficient to maintain adhesion of the first and second portions 130, 132 and the second and third portions 132, 160, respectively, during dispensing and/or application to a surface. In some aspects, the width of the first overlapping region 134 and/or the second overlapping region 164 may be based at least in part on a width that provides a desired amount of exposed surface area of the first and/or second adhesive layers 140, 146 and the second and/or third adhesive layers 146, 168, respectively. In some aspects, the width of the first and second portions 130, 132 and the width of the first overlapping region 134 can be selected based at least in part on a desired strength suitable for dispensing and/or the intended application. In some aspects, the width of the second and third portions 132, 160 and the width of the second overlapping region 164 can be selected based at least in part on a desired strength suitable for dispensing and/or the intended application. For example, while paper substrates may provide cost savings compared to some polymeric substrates, as the width of the paper substrate increases, the likelihood of unintentional tearing of the paper substrate during dispensing and/or use may increase.

In some aspects, the first, second, and third portions 130, 132, and 160 can have a width of from about 20 mm to 100 mm or more. For example, the first, second, and third portions 130, 132, and 160 can have a width of from about 20 mm to about 100 mm, about 20 mm to about 85 mm, about 20 mm to about 70 mm, about 20 mm to about 50 mm, about 20 mm to about 40 mm, about 30 mm to about 100 mm, about 30 mm to about 85 mm, about 30 mm to about 70 mm, about 30 mm to about 50 mm, about 30 mm to about 40 mm, about 40 mm to about 100 mm, about 40 mm to about 85 mm, about 40 mm to about 70 mm, about 40 mm to about 50 mm, about 50 mm to about 100 mm, about 50 mm to about 85 mm, or about 50 mm to about 70 mm. In some examples, the first and third portions 130 and 160 can have a width of from about 20 mm to about 80 mm and the second portion 132 can have a width of from about 20 mm to about 40 mm. Each of the first, second, and third portions 130, 132, and 160 can have the same width or one or more of the first, second, and third portions 130, 132, and 160 can have a width that is different than the other of the first, second, and third portions 130, 132, and 160.

The first, second, and third portions 130, 132, and 160 can have any suitable thickness based at least in part on the materials used to form the first, second and third substrates 136, 144, and 162 and/or the first, second, and third adhesive layers 140, 146, and 168, respectively. In some aspects, the first, second, and third portions 130, 132, and 160 can have thickness of from about 50 μm to about 200 μm. For example, the first, second, and third portions 130, 132, and 160 can have a thickness of from about 50 μm to about 200 μm, about 50 μm to about 180 μm, about 50 μm to about 160 μm, about 50 μm to about 140 μm, about 50 μm to about 120 μm, about 50 μm to about 100 μm, about 50 μm to about 80 μm, about 60 μm to about 200 μm, about 60 μm to about 180 μm, about 60 μm to about 160 μm, about 60 μm to about 140 μm, about 60 μm to about 120 μm, about 60 μm to about 100 μm, about 60 μm to about 80 μm, about 80 μm to about 200 μm, about 80 μm to about 180 μm, about 80 μm to about 160 μm, about 80 μm to about 140 μm, about 80 μm to about 120 μm, about 80 μm to about 100 μm, about 100 μm to about 200 μm, about 100 μm to about 180 μm, about 100 μm to about 160 μm, about 100 μm to about 140 μm, about 100 μm to about 120 μm, about 120 μm to about 200 μm, about 120 μm to about 180 μm, about 120 μm to about 160 μm, about 120 μm to about 140 μm, about 140 μm to about 200 μm, about 140 μm to about 180 μm, about 140 μm to about 160 μm, about 160 μm to about 200 μm, about 160 μm to about 180 μm, or about 180 μm to about 200 μm. For example, the first, second, and third portions 130, 132, and 160 can have a thickness of about 50 μm, about 54 μm, about 60 μm, about 70 μm, about 80 μm, about 100 μm, about 110 μm, about 120 μm, about 130 μm, about 132 μm, about 140 μm, about 150 μm, about 160 μm, about 168 μm, about 170 μm, about 180 μm, about 190 μm, about 200 μm, or any thickness between these values. In some examples, at least one of the first, second, and/or third portions 130, 132, and 160 includes a paper substrate 136, 144, 162, respectively, and has a thickness of from about 130 μm to about 200 μm, about 140 μm to about 200 μm, about 150 μm to about 200 μm, about 160 μm to about 200 μm, about 170 μm to about 200 μm, or about 180 μm to about 200 μm. In some examples, at least one of the first, second, and third portions 130, 132, and/or 160 includes a polymeric substrate 136, 144, and 162, respectively, and has a thickness of from about 50 μm to about 180 μm, about 50 μm to about 160 μm, about 50 μm to about 140 μm, about 50 μm to about 120 μm, about 50 μm to about 100 μm, about 50 μm to about 80 μm, about 60 μm to about 180 μm, about 60 μm to about 160 μm, about 60 μm to about 140 μm, about 60 μm to about 120 μm, about 60 μm to about 100 μm, about 60 μm to about 80 μm, about 80 μm to about 180 μm, about 80 μm to about 160 μm, about 80 μm to about 140 μm, about 80 μm to about 120 μm, about 80 μm to about 180 μm, about 100 μm to about 180 μm, about 100 μm to about 160 μm, about 100 μm to about 140 μm, about 100 μm to about 120 μm, about 120 μm to about 180 μm, about 120 μm to about 160 μm, about 120 μm to about 140 μm, about 140 μm to about 180 μm, about 140 μm to about 160 μm, or about 160 μm to about 180 μm. In one exemplary embodiment, the first and third portions 130 and 160 include a polymeric substrate 136 and 162, respectively, and the second portion 132 includes a paper substrate 144. Each of the first, second, and third portions 130, 132, and 160 can have the same thickness or one or more of the first, second, and third portions 130, 132, and 160 can have a thickness that is different than the other of the first, second, and third portions 130, 132, and 160.

In some aspects, the first, second, and/or third adhesive layers 140, 146, and 168 can have an adhesive coating weight of from about 15 g/m² to about 60 g/m². For example, the first, second, and/or third adhesive layers 140, 146, and 168 can have an adhesive coating weight of from about 15 g/m² to about 60 g/m², about 15 g/m² to about 50 g/m², about 15 g/m² to about 40 g/m², about 15 g/m² to about 30 g/m², about 20 g/m² to about 60 g/m², about 20 g/m² to about 50 g/m², about 20 g/m² to about 40 g/m², about 20 g/m² to about 30 g/m², about 30 g/m² to about 60 g/m², about 30 g/m² to about 50 g/m², about 30 g/m² to about 40 g/m², about 40 g/m² to about 60 g/m², about 40 g/m² to about 50 g/m², or about 50 g/m² to about 60 g/m². For example, the first, second, and/or third adhesive layers 140, 146, and 168 can have an adhesive coating weight of about 15 g/m², about 20 g/m², about 25 g/m², about 27 g/m², about 28 g/m², about 30 g/m², about 32 g/m², about 35 g/m², about 40 g/m², about 42 g/m², about 45 g/m², about 50 g/m², about 55 g/m², about 60 g/m², or any adhesive coating weight between these values. In some examples, at least one of the first, second, and/or third adhesive layers 140, 146, and 168 includes a paper substrate 136, 144, and 162, respectively, and the corresponding adhesive layer 140, 146, 168 has an adhesive coating weight of from about 40 g/m² to about 60 g/m², about 45 g/m² to about 60 g/m², about 50 g/m² to about 60 g/m², about 40 g/m² to about 55 g/m², about 45 g/m² to about 55 g/m², about 50 g/m² to about 55 g/m², about 40 g/m² to about 50 g/m², or about 45 g/m² to about 50 g/m². In some examples, at least one of first, second, and/or third adhesive layers 140, 146, and 168 includes a polymeric substrate 136, 144, and 162, respectively, and the corresponding adhesive layer 140, 146, and 168 has an adhesive coating weight of from about 15 g/m² to about 50 g/m², about 15 g/m² to about 45 g/m², about 15 g/m² to about 40 g/m², about 15 g/m² to about 35 g/m², about 20 g/m² to about 50 g/m², about 20 g/m² to about 45 g/m², about 20 g/m² to about 40 g/m², about 20 g/m² to about 35 g/m², about 25 g/m² to about 50 g/m², about 25 g/m² to about 45 g/m², about 25 g/m² to about 40 g/m², about 25 g/m² to about 35 g/m², about 30 g/m² to about 50 g/m², about 30 g/m² to about 45 g/m², about 30 g/m² to about 40 g/m², about 30 g/m² to about 35 g/m², about 35 g/m² to about 50 g/m², about 35 g/m² to about 45 g/m², or about 40 g/m² to about 50 g/m². In one exemplary embodiment, the first and third portions 130 and 160 include a polymeric substrate 136 and 162, respectively, and the second portion 132 includes a paper substrate 144. Each of the first, second, and third portions 130, 132, and 160 can have the same adhesive coating weight or one or more of the first, second, and third portions 130, 132, and 160 can have an adhesive coating weight that is different than the other of the first, second, and third portions 130, 132, and 160.

The first and second overlapping regions 134 and 164 can have any suitable width and in some aspects are selected to provide a sufficient seal between the first and second portions 130, 132 and the second and third portions 132, 160, respectively, to protect the masked portion of the object during a painting process. In some aspects, the width of the first overlapping region 134 may be selected at least in part to provide a desired bond strength between the first and second portions 130, 132 and the width of the second overlapping region 164 may be selected at least in part to provide a desired bond strength between the second and third portions 132 and 160. In some aspects, the width of the first overlapping region 134 is selected at least in part based on characteristics of the first and second portions 130, 132, non-limiting examples of which include the dimensions of the first and second portions 130, 132 and the type of material forming the respective substrates 136, 144. In some aspects, the width of the second overlapping region 164 is selected at least in part based on characteristics of the second and third portions 132, 160, non-limiting examples of which include the dimensions of the second and third portions 132, 160 and the type of material forming the respective substrates 144, 162. For example, the first and/or second overlapping regions 134 and 164 can have a width of at least about 6 mm, at least about 8 mm, or at least about 10 mm. In some examples, when at least one of the first and second substrates 136, 144 and/or at least one of the second and third substrates 144, 162 are made from a paper-based material, the first overlapping region 134 and/or second overlapping region 164, respectively, can have a width of at least about 6 mm, at least about 8 mm, or at least about 10 mm. In some examples, when at least one of the first and second substrates 136, 144 and/or at least one of the second and third substrates 144, 162 are made from a paper-based material, the first overlapping region 134 and/or the second overlapping region 164, respectively, preferably has a width of at least 10 mm.

In some aspects, the first and third portions 130 and 160 and the first and second overlapping regions 134, 164 have the same dimensions such that the tape assembly 110 is symmetric with respect to a longitudinal axis of the tape body 112 that is aligned with the first and second edges 114, 116. In some other aspects, the first and third portions 130 and 160 and/or the first and second overlapping regions 134, 164 can have different dimensions such that tape assembly 110 is not symmetric about the longitudinal axis of the tape body 112.

While the tape assembly 110 is illustrated as having three portions with an adhesive layer exposed on alternating sides of the tape body 112, it is understood that the tape assembly 110 can have any number of portions formed in a manner similar to that described above with respect to the first, second, and third portions 130, 132, and 160. In addition, while the tape assembly 110 is illustrated as having an adhesive pattern in which the first adhesive layer 140 is exposed on the posterior side 120, the second adhesive layer 146 is exposed on the anterior side 118, and the third adhesive layer 168 is exposed on the posterior side 120, the tape portions can be arranged to provide the first, second, and third adhesive layers 140, 146, and 168, and any additional adhesives, in any regular or irregular adhesive pattern.

Figure 3:
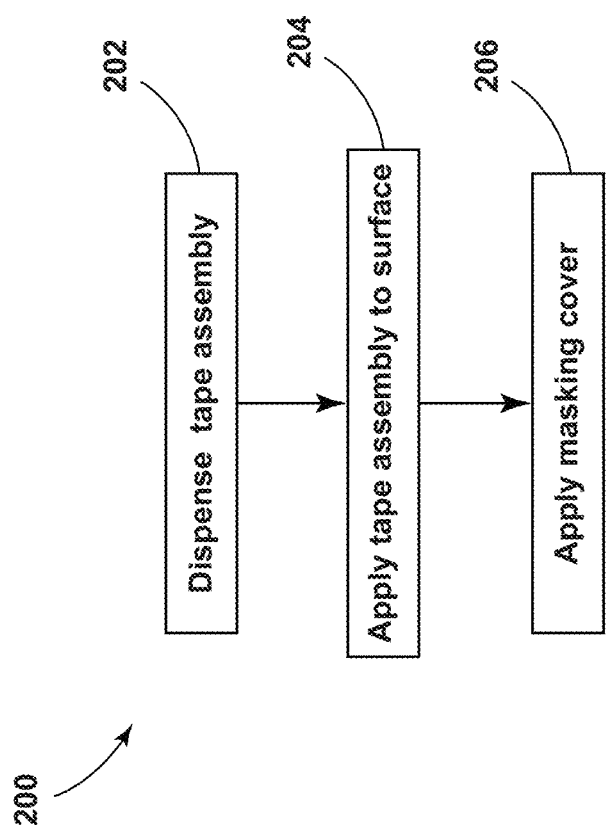
FIG. 3 is a flow chart illustrating a method of use of a tape assembly including a tape body having first, second, and third portions, according to an aspect of the present disclosure.

FIG. 3 illustrates a method 200 of masking an object to be painted using the tape assembly 110 of the present disclosure. While the method 200 is discussed in the context of masking components of an automobile during a painting process, it will be understood that the tape assembly 110 can be used in a similar manner in a variety of different applications in which it is desired to mask a surface.

The method 200 can include a step 202 of dispensing at least a portion of a length of the tape assembly 110 for application to a surface of the object being masked. In some aspects, the tape assembly 110 can be stored as a wound roll and the dispensing at 202 can include unwinding the roll to dispense a desired length of the tape assembly 110. Depending on the types of material forming the tape assembly 110, the desired length can be separated from the roll by tearing and/or cutting the tape body 112 using a sharp tool (e.g., scissors, knife, serrated blade, etc.). In some aspects, the tape assembly 110 can be stored as pre-cut strips and the dispensing at step 202 can include peeling the top strip away from a stack of pre-cut strips. In some aspects, one or more of the first, second, and/or third portions 130, 132, and 160 of the tape assembly 110 can be stored as an individual roll that is unwound and laminated with an adjacent portion of the tape assembly 110 at the time of dispensing. For example, the first, second, and third portions 130, 132, 160 can each be stored as separate rolls. In this configuration, the dispensing step 202 can include unwinding each of the first, second, and third portions 130, 132, and 160, partially overlapping the unwound portions of the first portion 130 and the second portion 132 and partially overlapping the unwound portions of the second portion 132 (opposite the side partially overlapped with the first portion 130) and the third portion 160 and applying heat, pressure, and/or an adhesive to the overlapped portions to form the first and second overlapping regions 134 and 164, respectively. In this manner, the tape assembly 110 can be provided "on-demand."

Figure 4:
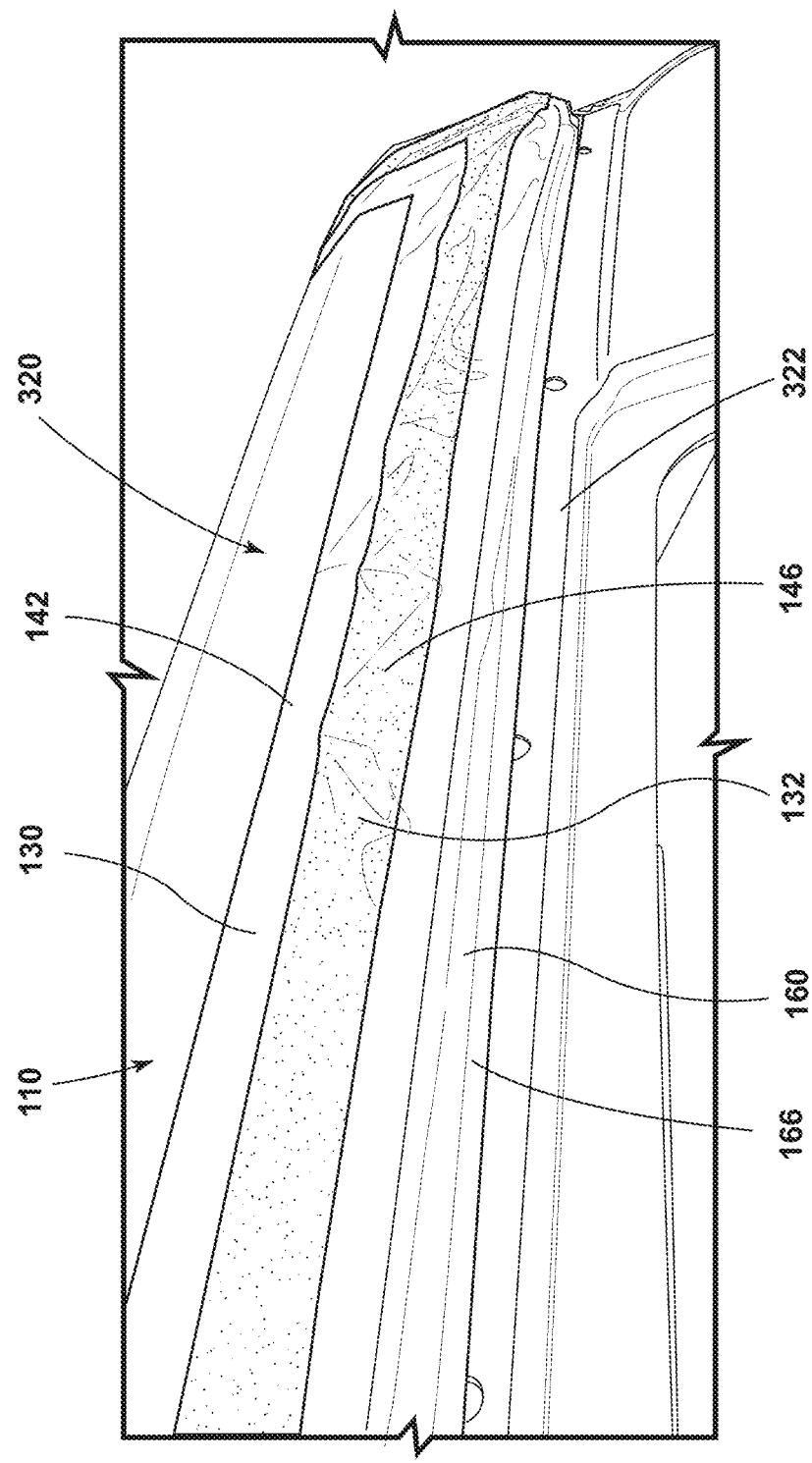
FIG. 4 is a perspective view of a tape assembly including a tape body having first, second, and third portions in use on a vehicle during a painting process, prior to application of a masking cover, according to an aspect of the present disclosure.

The dispensed tape assembly 110 can be applied along one or more edges of the object or a portion of a surface of an object to be masked at 204. When the tape assembly 110 is dispensed as a roll, the desired length of tape assembly 110 to be applied to the surface of the object can be cut before, during, and/or after the dispensed length is adhered to the surface of the object. The tape assembly 110 can be applied to the surface of the object to be masked by applying the first adhesive layer 140 to the surface of the object and optionally applying pressure (e.g., pressing by an operator's hand and/or with the use of a tool) to seal the first adhesive layer 140 to the surface. The first adhesive layer 140 can be adhered to the surface to provide a seal that inhibits or prevents material from being applied to the masked surface underneath the first portion 130 during the painting process. The third portion 160 of the tape assembly 110 can be applied to an adjacent portion of the surface in a manner similar to the first portion 130 to mask the surface underneath the third portion 160. For example, with reference to FIG. 4, in the exemplary embodiment of painting automobile components, the tape assembly 110 can be applied around the edges of a vehicle roof 320 to mask the vehicle roof 320 during a painting process of adjacent vehicle parts 322. As can be seen in FIG. 4, when the tape assembly 110 is applied around the edges of the roof 320 with the first portion 130 adhered to the edge of the roof 320 by the first adhesive layer 140, the first release coating 142 is exposed, the third portion 160 is adhered to an adjacent vehicle part 322 by the third adhesive layer 168, with the third release coating 166 exposed, and the second adhesive layer 146 of the second portion 132 is also exposed. In this manner, the first and third portions 130 and 160 are configured to form a seal around an area to be masked and are configured to maintain the second portion 132 in a desired position for application of a masking cover to be held in place by the second adhesive layer 146.

The tape assembly 110 having the first and third portions 130, 160 with an adhesive layer on the posterior side 120 of the tape body 112 can facilitate applying the tape assembly 110 around parts having surfaces extending in different planes and/or around corners and other complex shapes to sufficiently seal the area to be masked to inhibit or prevent material from being applied to the masked area during a painting process. For example, in the exemplary embodiment of FIG. 4, the vehicle roof 320 includes a 3-dimensional edge component that protrudes from an adjacent body portion 322 of the vehicle along an edge of the roof 320. The first and third portions 130 and 160 of the tape assembly 110 facilitate forming a seal around the protruding edge component of the vehicle roof 320. In addition, having the first and third portions 130, 160 on either side of the second portion 132 facilitates maintaining the second portion 132 in a desired position to facilitate attachment of the masking cover in a subsequent step. The use of both the first and third portions 130, 160 to attach to the tape assembly 110 to a surface provides increased flexibility in the shapes and dimensions of objects that can be masked while facilitating leaving the second adhesive 146 exposed and readily accessible to a user for attaching a masking cover.

After the tape assembly 110 has been applied to the surface of the object to be masked, a masking cover can be attached to the tape assembly 110 at step 206 (FIG. 3) using the exposed second adhesive layer 146 on the second portion 132. The second adhesive layer 146 can be used to hold the masking cover in place to mask the desired portions of the object during the subsequent painting process. The masking cover can be attached to one or more sections of the tape assembly 110 adhered around one or more edges of the area of the object to be masked. In some aspects, the tape assembly 110 extends entirely around a perimeter of the area to be masked and the masking cover is attached to the tape assembly 110 around the perimeter to form a seal around the entire area to be masked. In this manner, the masked area can be protected from material applied during the painting process.

For example, with respect to the exemplary embodiment illustrated in FIG. 4, the tape assembly 110 can be applied around a perimeter of the vehicle roof 320. A masking cover (not shown) can be attached to the tape assembly 110 using the exposed second adhesive layer 146 carried by the second portion 132 around the perimeter of the vehicle roof 320 to mask the vehicle roof 320. The unmasked components 322 of the vehicle can be painted while the roof 320 is protected by the masking cover. In some aspects, the masked region (e.g., roof 320) corresponds to a first painted region that has already been painted with a material to provide a desired decorative and/or functional coating. The tape assembly 110 and masking cover can protect the first painted region while other regions of the object are being painted (e.g., car body 322) to provide a second painted region that may include a decorative and/or functional coating that is different than the first painted region. Optionally, the tape assembly 110 and masking cover can protect the masked region while the unmasked region is being painted first and then the masked region can be painted after removal of the tape assembly 110 and masking cover.

Following the step of applying the masking cover at 206, the painting process and any additional assembling and/or manufacturing processes may proceed according to the particular application. For example, some painting processes require a heating step to cure the material applied to the surface. In these applications, the components of the tape assembly 110 can be selected to be heat stable at a predetermined temperature based on the parameters of the heating step. For example, the components of the tape assembly 110 can be selected to provide a heat stability of at least 100° C. for at least 1 hour based on the parameters of the heating step. Depending on the components of the tape assembly 110, the tape assembly 110 may exhibit a heat stability of at least 100° C. for 1 hour, at least 140° C. for 1 hour, at least 150° C. for 1 hour, at least 160° C. for 1 hour, or at least 200° C. for 1 hour. In some examples, the masking cover and/or tape assembly 110 may be removed before a heating step, in which application the components of the tape assembly 110 may not need to have a high heat stability.

When masking of the object is no longer needed, the masking cover and tape assembly 110 can be removed from the object to unmask the object. In some examples, the masking cover may be separated or torn away from the tape assembly 110 prior to removing the tape assembly 110 and/or the masking cover and tape assembly 110 can be removed generally at the same time. As discussed above, if the area to be masked already includes a decorative and/or functional surface coating, the tape assembly 110 can include adhesive layers 140, 168 that are configured to not damage the surface to which they are adhered and/or to leave little to no residue on the surface when the tape assembly 110 is removed. Adhesive materials that are used to form what are referred to in the automotive industry as "fine line" tapes can be used with the tape assembly 110 (e.g., adhesive layers 140 and/or 168) to allow the tape assembly 110 to be removed from the surface with little to no damage and/or to leave little to no adhesive layer residue behind. In some examples, at least the first and third portions 130 and 160 of the tape assembly 110 can be made using adhesive materials that have the characteristics typically found in fine line tapes.

The tape assembly 110 of the present disclosure can be used to mask and protect surfaces of an object during a painting process (or any type of coating process) in which a decorative and/or functional coating is applied to other, unmasked surfaces of an object. The tape assembly 110 of the present disclosure provides a tape that is capable of protecting the edges of a masked area and securing a masking cover to the object to protect portions of the object during a painting process. The tape assembly 110 of the present disclosure can be tailored based on the intended function of each portion of the tape. For example, the second portion 132 of the tape assembly 110 can have a second substrate 144, second adhesive layer 146, and optionally second release coating 148 specifically tailored for the intended application and desired masking cover. The components of the first portion 130 and third portion 160 of the tape assembly 110 can be selected based on the intended application and the particular surfaces to which they are to be adhered to. The tape assembly 110 also provides more options for configuring different widths, especially where larger widths are desired, compared to a conventional double-sided tape.

Conventional double-sided tapes typically include a separable release liner between each layer of tape that must be removed and disposed of during application of the tape to a surface. The process of removing the release liner and disposing of the release liner can increase application time, add steps to the application process, and generate waste that must be disposed of. In contrast, the configuration of the tape assembly 110 of the present disclosure allows the tape assembly 110 to be wound into a roll for storage and unwound during use without the use a separable release liner between each wound layer of the tape body 112. The absence of the removable release liner between each wound layer of the tape body 112 can decrease application time, remove steps from the application process, and decrease waste generated during application of the tape, which can provide time and/or cost savings. In addition, the configuration of the tape assembly 110 in which the second portion 132 is flanked by the first and third portions 130, 160 facilitates holding the second portion 132 in a desired orientation, which may facilitate attachment of the masking cover and provide time and/or cost savings in some applications. Optionally, a protective release liner may be provided around the exterior of a wound roll of the tape assembly 110 for storage and/or transport.

Figure 5:
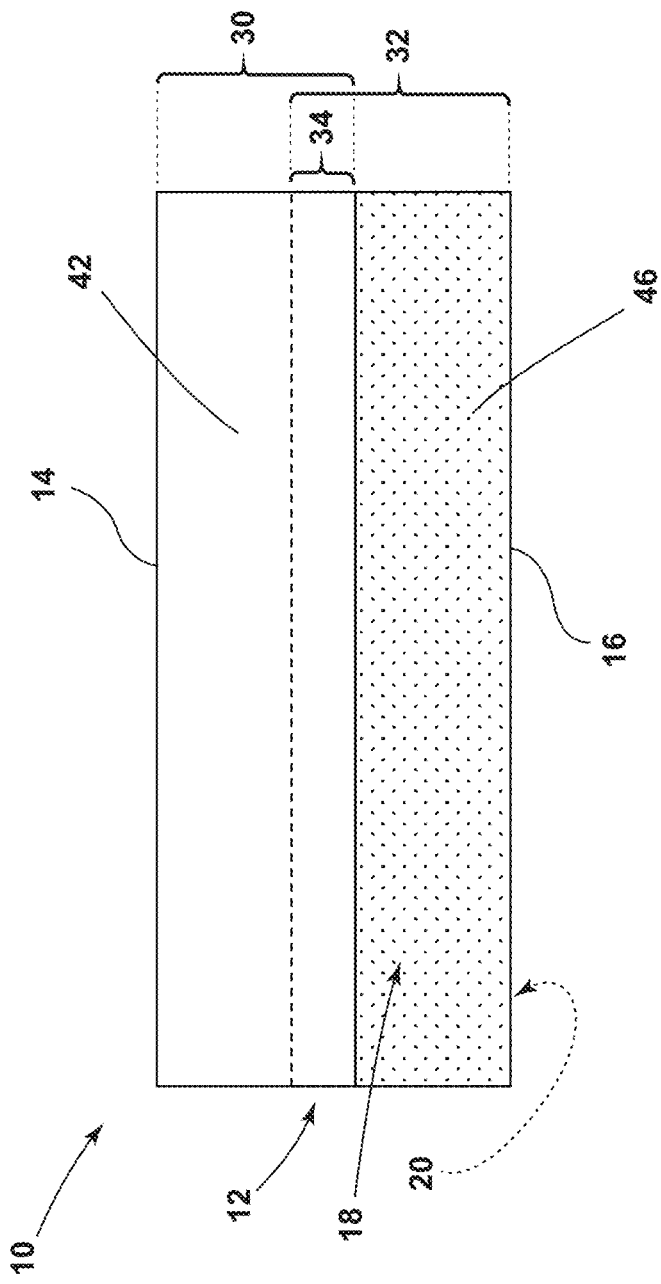
FIG. 5 is a top down view of a tape including a tape body having first and second portions according to the prior art.
Figure 6:
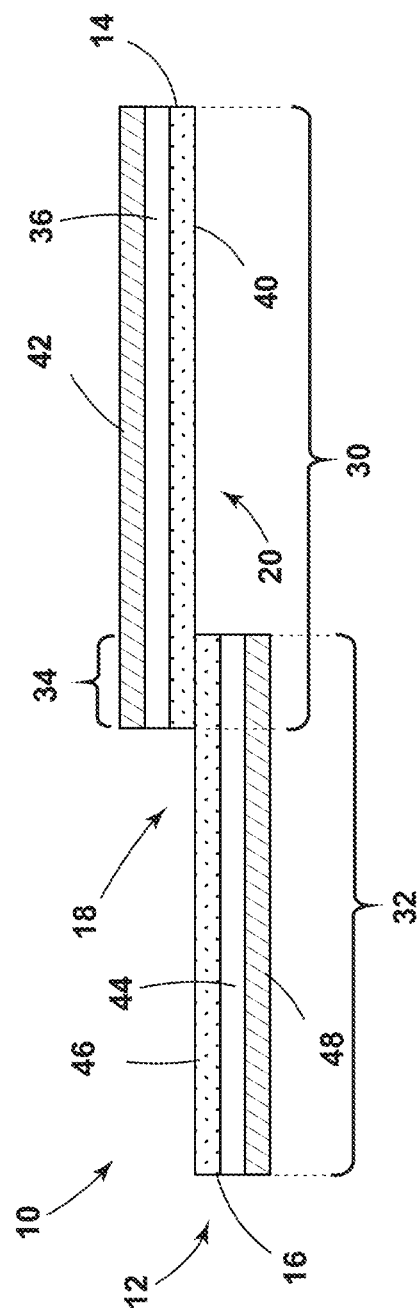
FIG. 6 is a cross-sectional view of the prior art tape of FIG. 5.

FIGS. 5-6 illustrate a tape 10 according to the prior art that includes a tape body 12 having opposing first and second edges 14 and 16, an anterior side 18, and a posterior side 20. The tape 10 includes a first portion 30 that partially overlaps with a second portion 32 in an overlapping region 34. The first portion 30 includes a first backing 36, a first adhesive layer 40 on the posterior side 20 of the tape body 12 (corresponding to the posterior side of the first backing 36), and a first release layer 42 on the anterior side 18 of the tape body 12 (corresponding to the anterior side of the first backing 36). The second portion 32 includes a second backing 44, a second adhesive layer 46 on the anterior side 18 of the tape body 12 (corresponding to the anterior side of the second backing 44), and a second release layer 48 on the posterior side 20 of the tape body 12 (corresponding to the posterior side of the side of the backing 44). In a typical application, the prior art tape 10 can be adhered to a surface by the first adhesive 40 layer of the first portion 30, while leaving the second adhesive layer 46 of the second portion 32 exposed. A masking cover can then be adhered to the second adhesive layer 46 for masking an area during a painting process.

In some applications, the prior art tape 10 can be challenging to use. For example, when the prior art tape 10 is applied horizontally along an edge of an area to be masked, the second portion 32 can droop or fold over on itself, which can decrease accessibility of the second adhesive layer 46 and make it more challenging for a user to attach a masking cover to the adhesive layer 46. In some cases, a user may have to hold the second portion 32 in a desired orientation to provide access to the second adhesive layer 46, which can be time consuming and cumbersome for the user. In contrast, the tape assembly 110 according to the present aspects includes first and third portions 130 and 160 that flank the second portion 132. The first and third portions 130, 160 both adhere to a surface to be masked and maintain the second adhesive layer 146 of the second portion 132 in an exposed, accessible position, regardless of which angle or orientation the tape assembly 110 is applied to an object. In this manner, a user can adhere a masking cover to the second adhesive layer 146 without having to use his/her hand to hold the second adhesive layer 146 in an accessible orientation, which can save the user time and make adhering the masking cover to the second adhesive layer 146 less burdensome. In addition, the first and third portions 130, 160 of the present tape assembly 110 can be attached to surfaces extending in different planes, allowing the tape assembly 110 to be used to mask around corners of objects where two or more edges/side of an object meet, rather than just along a single edge of an object. For example, the first portion 130 can be adhered to a first surface, extending in a first plane, and the third portion 160 can be adhered to an adjacent second surface that extends in a second plane that intersects the first plane. The first and third portions 130, 160 can maintain the orientation of the second portion 132 adjacent to edges and corners, around corners, and even on the underside of an overhang to maintain accessibility of the second adhesive layer 146 for adhering a masking cover. In contrast, the prior art tape 10 can only secure the second portion 32 along one edge, leaving the other edge free to move, droop, and/or fold in on itself, decreasing accessibility of the second adhesive layer 46 and making the prior art tape 10 difficult to use around corners or on the underside of an object.

EXAMPLES

The following examples describe various features and advantages provided by the disclosure, and are in no way intended to limit the invention and appended claims.

Table 1 below illustrates Exemplary Tapes A-H (Ex. A-H) that can be used to form any of the first, second, and/or third portions 130, 132, and 160 of the tape assembly 110 according to aspects of the present disclosure. The exemplary tapes in Table 1 exhibit properties that are characteristic of tapes typically characterized as fine line tapes. In some aspects, the exemplary tapes in Table 1 are particularly useful as the first portion 130 and third portion 160 of the tape assembly 110 for adhering the tape assembly 110 to a surface of an object to be masked. "PVC" refers to polyvinylchloride. "PET" refers to polyethylene terephthalate.

TABLE 1

| | Exemplary Tapes A-H | | | | |
|---|---|---|---|---|---|
| Exemplary Tape | Ex. A | Ex. B | Ex. C | Ex. D | Ex. E |
| Substrate (backing) | PVC | PVC | PVC | PVC | PVC |
| Thickness (μm) | 110 | 100 | 110 | 137 | 132 |
| Adhesive | Natural Rubber | Natural Rubber | Natural Rubber | Natural Rubber | Acrylic |
| Coating weight (g/m$^2$) | 30 | 20 | 28 | 42 | N/A |
| Peel adhesion to stainless steel (N/cm) | 3.7 | 3.1 | 3.7 | 5.4 | 2 |

TABLE 1-continued

Exemplary Tapes A-H

| | | | | | |
|---|---|---|---|---|---|
| Temperature stability | 150° C./1 hour | 160° C./1 hour | 140° C./1 hour | 140° C./1 hour | 160° C./1 hour |
| Tensile strength (N/cm) | 25 | 25 | 26.66 | 36 | 30 |
| Elongation at break (%) | 200 | 200 | 237 | 252 | 240 |

| Exemplary Tape | Ex. F | Ex. G | Ex. H |
|---|---|---|---|
| Substrate (backing) | PVC/PET laminate | PET | PET |
| Thickness (μm) | 168 | 60 | 54 |
| Adhesive | Natural Rubber | Silicone | Natural Rubber |
| Coating weight (g/m$^2$) | 27 | N/A | 32 |
| Peel adhesion to stainless steel (N/cm) | 4 | 3.5 | 3.3 |
| Temperature stability | 170° C./1 hour | 220° C./7 hour | 150° C./1 hour |
| Tensile strength (N/cm) | 73 | 45 | 47 |
| Elongation at break (%) | 130 | 130 | 120 |

Table 2 below illustrates Exemplary Tapes I-L (Ex. I-L) that can be used to form any of the first, second, and/or third portions 130, 132, and 160 of the tape assembly 110 according to aspects of the present disclosure. In some aspects, the exemplary tapes in Table 2 are particularly useful as the second portion 132 of the tape assembly 110 for adhering a masking cover to the tape assembly 110. Ex. I-L includes tapes that have paper substrates and may be referred to as "paper masking tape."

TABLE 2

Exemplary Tapes I-L

| Exemplary Tape | Ex. I | Ex. J | Ex. K | Ex. L |
|---|---|---|---|---|
| Substrate (backing) | Slightly-creped paper | Slightly-creped paper | Slightly-creped paper | Slightly-creped paper |
| Thickness (μm) | 170 | 140 | 170 | 170 |
| Adhesive | Natural Rubber | Natural Rubber | Natural Rubber | Natural Rubber |
| Coating weight (g/m$^2$) | 50 | 50 | 45 | 45 |
| Peel adhesion to stainless steel (N/cm) | 3.5 | 3.4 | 4 | 4 |
| Temperature stability | 120° C. | 100° C. | 140° C. | N/A |
| Tensile strength (N/cm) | 46.66 | 38 | 46.66 | 46.66 |
| Elongation at break (%) | 12 | 10 | 12 | 10 |

Paper masking tapes, such as Ex. I-L, which have a paper substrate, typically exhibit less strength than the fine line tapes of Ex. A-H of Table 1 that include a polymeric substrate. The lower strength may make the paper masking tapes easier to tear by hand, compared to some of the fine line tapes of Ex. A-H, which may be desirable in some applications. Paper masking tapes may also be less expensive than some tapes that have a polymeric substrate. The configuration of the tape assembly 110 of the present disclosure allow for paper masking tapes, such as Ex. I-L, to be used in combination with tapes that include polymeric substrates, such as Ex. A-H, to take advantage of the cost savings available with some paper masking tapes and the increased strength associated with some tapes having polymeric substrates. The use of tapes having polymeric substrates, such as Ex. A-H in the tape assembly 110, may also facilitate the use of paper masking tapes having larger width dimensions, which is desirable in some applications, but which can be challenging due to the decreased strength (and thus greater likelihood of unintentional tearing) of some paper masking tapes. The addition of one or more partially overlapping tapes having polymeric substrates (e.g., first and third portions 130, 160 of the tape assembly 110) to the paper masking tapes, may decrease the likelihood of unintentional tearing of the paper masking tape.

Table 3 illustrates dimensions for an Exemplary Tape Assembly A. Ex. Tape Assembly A had a configuration as shown in FIGS. 1-2 in which the tape assembly 110 includes the first portion 130 partially overlapped with the second portion 132 in the first overlapping region 134 and the third portion 160 partially overlapped with the second portion 132 in the second overlapping region 164.

TABLE 3

Exemplary Tape Assembly Dimensions

|  | Ex. Tape Assembly A |
|---|---|
| First portion width (mm) | 25 |
| Second portion width (mm) | 38 |
| First overlapping region (mm) | 10 |
| Third portion width (mm) | 25 |
| Second overlapping region (mm) | 10 |

The following non-limiting aspects are encompassed by the present disclosure. To the extent not already described, any one of the features of the following aspects may be combined in part or in whole with features of any one or more of the other aspects of the present disclosure to form additional aspects, even if such a combination is not explicitly described.

According to a first aspect of the present disclosure, a tape assembly for masking an object to be coated comprises: a tape body defined by an anterior side, a posterior side, a body first edge, and an opposing body second edge, wherein the tape body comprises: a first portion that extends along the body first edge and comprises a first substrate having a first adhesive layer on a posterior side of the first substrate; a second portion extending along a proximal edge of the first portion, opposite the body first edge, and comprising a second substrate having a second adhesive layer on an anterior side of the second substrate, wherein the proximal edge of the first portion partially overlaps the second portion to form a first overlapping region, and a third portion extending along the body second edge and adjacent to the second portion, the third portion comprising a third substrate having a third adhesive layer on a posterior side of the third substrate, wherein a proximal edge of the third portion, opposite the body second edge, partially overlaps the second portion to form a second overlapping region, and wherein the first overlapping region is spaced from the second overlapping region such that at least a portion of the second adhesive layer is exposed between the first and second overlapping regions.

According to a second aspect of the present disclosure, the tape assembly of aspect 1, wherein the first adhesive layer, the second adhesive layer, and the third adhesive layer comprise the same adhesive material.

According to a third aspect of the present disclosure, the tape assembly of aspect 1 or aspect 2, wherein the first portion, the second portion, and the third portion are heat stable at a temperature of at least 100° C. for at least 1 hour.

According to a fourth aspect of the present disclosure, the tape assembly of any one of aspects 1-3, wherein at least one of the first adhesive layer, second adhesive layer, and third adhesive layer comprise an adhesive selected from natural rubber adhesives, acrylic-based adhesives, silicone-based adhesives, rubber-based adhesives, modified acrylic-based adhesives, modified rubber-based adhesives, and combinations thereof.

According to a fifth aspect of the present disclosure, the tape assembly of any one of aspects 1-4, wherein the first adhesive layer abuts the second adhesive layer in the first overlapping region and the third adhesive layer abuts the second adhesive layer in the second overlapping region.

According to a sixth aspect of the present disclosure, the tape assembly of any one of aspects 1-5, wherein at least one of the first adhesive layer, second adhesive layer, and third adhesive layer have a peel adhesion to stainless steel of from about 1.8 N/cm to about 6 N/cm.

According to a seventh aspect of the present disclosure, the tape assembly of any one of aspects 1-6, wherein the first portion is bonded to the second portion in the first overlapping region and the third portion is bonded to the second portion in the second overlapping region by at least one of a pressure bond, heat bond, adhesive bond, and combinations thereof.

According to an eighth aspect of the present disclosure, the tape assembly of any one of aspects 1-7, further comprising a release coating disposed on at least one of the anterior side of the first portion, posterior side of the second portion, and anterior side of the third portion.

According to a ninth aspect of the present disclosure, the tape assembly of aspect 8, wherein the release coating comprises a material selected from carbamate and silicone.

According to a tenth aspect of the present disclosure, the tape assembly of any one of aspects 1-9, wherein the first substrate, second substrate, and third substrate comprise a material selected from paper, creped-pa per, polyvinylchloride, polyvinylchloride-polyethylene terephthalate laminates, polyethylene terephthalate, polypropylene, polyethylene, mono-oriented polypropylene (MOPP), non-woven synthetic materials, non-woven natural materials, woven synthetic materials, woven natural materials, fleece, fabric, and combinations thereof.

According to an eleventh aspect of the present disclosure, the tape assembly of any one of aspects 1-9, wherein: the first substrate and the third substrate comprise a material selected from polyvinylchloride, polyvinylchloride-polyethylene terephthalate laminates, polyethylene terephthalate, polypropylene, polyethylene, and mono-oriented polypropylene (MOPP); and the second substrate comprises a material selected from paper and creped-paper.

According to a twelfth aspect of the present disclosure, a method of masking an object to be coated comprises: dispensing a tape assembly defined by a tape body having an anterior side, a posterior side, a body first edge, and an opposing body second edge, wherein the tape body comprises: a first portion that extends along the body first edge and comprises a first substrate having a first adhesive layer on a posterior side of the first substrate; a second portion comprising a second substrate having a second adhesive layer on an anterior side of the second substrate, wherein the first portion partially overlaps with the second portion to form a first overlapping region; and a third portion that extends along the body second edge, the third portion comprising a third substrate having a third adhesive layer on a posterior side of the third substrate, wherein a proximal edge of the third portion, opposite the body second edge, partially overlaps the second portion to form a second overlapping region, spaced from the first overlapping region; and applying the first adhesive layer and the third adhesive layer along at least one edge of a region of an object to be masked; and applying a masking cover to the second adhesive layer of the second portion to retain the masking cover in place over the region of the object to be masked.

According to a thirteenth aspect of the present disclosure, the method of aspect 12, wherein the dispensing a tape assembly comprises unwinding a roll of the tape body.

According to a fourteenth aspect of the present disclosure, the method of aspect 12 or aspect 13, wherein the object comprises at least one of a vehicle body and vehicle body part.

According to a fifteenth aspect of the present disclosure, the method of any one of aspects 12-14, wherein prior to dispensing the tape assembly, the method further comprises: painting a first region of the object to form a first painted region, and wherein the applying the first adhesive layer and the third adhesive layer comprises applying the tape assembly along at least one edge of the first painted region, and wherein the applying a masking cover comprises applying the masking cover to the second adhesive layer of the second portion to retain the masking cover in place over the first painted region.

According to a sixteenth aspect of the present disclosure, the method of aspect 15, further comprising: painting a second region of the object, adjacent to the first painted region, to form a second painted region; and subsequent to painting the second region of the object, removing the tape assembly from the object to unmask the first painted region.

According to a seventeenth aspect of the present disclosure, the method of any one of aspects 12-16, wherein the first adhesive layer and the third adhesive layer comprise the same adhesive material.

According to an eighteenth aspect of the present disclosure, the method of any one of aspects 12-17, wherein the tape assembly further comprises a release coating disposed on at least one of the anterior side of the first portion, posterior side of the second portion, and anterior side of the third portion.

According to a nineteenth aspect of the present disclosure, the method of any one of aspects 12-18, wherein the first portion is bonded to the second portion in the first overlapping region by at least one of a pressure bond, heat bond, adhesive bond, and combinations thereof.

According to a twentieth aspect of the present disclosure, the method of any one of aspects 12-19, wherein at least one of the first adhesive layer, second adhesive layer, and third adhesive layer comprise an adhesive selected from natural rubber adhesives, acrylic-based adhesives, silicone-based adhesives, rubber-based adhesives, modified acrylic-based adhesives, modified rubber-based adhesives, and combinations thereof.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

What is claimed is:

1. A tape assembly for masking an object to be coated, comprising:
   a tape body defined by an anterior side, a posterior side, a body first edge, and an opposing body second edge, wherein the tape body comprises:
   a first portion that extends along the body first edge and comprises a first substrate having a first adhesive layer on a posterior side of the first substrate;
   a second portion extending along a proximal edge of the first portion, opposite the body first edge, and comprising a second substrate having a second adhesive layer on an anterior side of the second substrate, wherein the proximal edge of the first portion partially overlaps the second portion to form a first overlapping region, and
   a third portion extending along the body second edge and adjacent to the second portion, the third portion comprising a third substrate having a third adhesive layer on a posterior side of the third substrate, wherein a proximal edge of the third portion, opposite the body second edge, partially overlaps the second portion to form a second overlapping region,
   wherein the first overlapping region is spaced from the second overlapping region such that at least a portion of the second adhesive layer is exposed between the first and second overlapping regions,
   wherein each of the first adhesive layer and the third adhesive layer is removable and has a peel adhesion to stainless steel of from about 1.8 N/cm to about 6 N/cm,
   wherein the second adhesive layer has a peel adhesion to stainless steel of from about 3 N/cm to about 5 N/cm, and
   wherein each of the first, second and third adhesive layers has an adhesive coating weight from about 15 to 35 g/m$^2$.

2. The tape assembly of claim 1, wherein the first adhesive layer, the second adhesive layer, and the third adhesive layer comprise the same adhesive material.

3. The tape assembly of claim 1, wherein the first portion, the second portion, and the third portion are heat stable at a temperature of at least 100° C. for at least 1 hour.

4. The tape assembly of claim 1, wherein at least one of the first adhesive layer, second adhesive layer, and third adhesive layer comprise an adhesive selected from natural rubber adhesives, acrylic-based adhesives, silicone-based adhesives, rubber-based adhesives, modified acrylic-based adhesives, modified rubber-based adhesives, and combinations thereof.

5. The tape assembly of claim 1, wherein the first adhesive layer abuts the second adhesive layer in the first overlapping region and the third adhesive layer abuts the second adhesive layer in the second overlapping region.

6. The tape assembly of claim 1, wherein the first portion is bonded to the second portion in the first overlapping region and the third portion is bonded to the second portion in the second overlapping region by at least one of a pressure bond, heat bond, adhesive bond, and combinations thereof.

7. The tape assembly of claim 1, further comprising a release coating disposed on at least one of the anterior side of the first portion, posterior side of the second portion, and anterior side of the third portion.

8. The tape assembly of claim 7, wherein the release coating comprises a material selected from carbamate and silicone.

9. The tape assembly of claim 1, wherein the first substrate, second substrate, and third substrate comprise a material selected from paper, creped-paper, polyvinylchloride, polyvinylchloride-polyethylene terephthalate laminates, polyethylene terephthalate, polypropylene, polyethylene, mono-oriented polypropylene (MOPP), non-woven synthetic materials, non-woven natural materials, woven synthetic materials, woven natural materials, fleece, fabric, and combinations thereof.

10. The tape assembly of claim 1, wherein:
the first substrate and the third substrate comprise a material selected from polyvinylchloride, polyvinylchloride-polyethylene terephthalate laminates, polyethylene terephthalate, polypropylene, polyethylene, and mono-oriented polypropylene (MOPP); and the second substrate comprises a material selected from paper and creped-paper.

11. The tape assembly of claim 1, wherein a width of each of the first and third portions is from about 20 to 40 mm, wherein a width of the second portion is from about 30 to 40 mm, and further wherein a width of each of the overlapping regions is from about 6 to 10 mm.

12. The tape assembly of claim 1, wherein the second adhesive layer has a peel adhesion to stainless steel of from about 3 N/cm to about 4 N/cm.

* * * * *